(12) United States Patent
Sako et al.

(10) Patent No.: US 10,437,101 B2
(45) Date of Patent: Oct. 8, 2019

(54) DISPLAY DEVICE WITH AN ILLUMINATOR HAVING PLURALITY OF SEGMENT BLOCKS

(71) Applicant: Japan Display Inc., Tokyo (JP)

(72) Inventors: Kazuhiko Sako, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/150,949

(22) Filed: Oct. 3, 2018

(65) Prior Publication Data

US 2019/0107754 A1    Apr. 11, 2019

(30) Foreign Application Priority Data

Oct. 11, 2017 (JP) .................. 2017-198039

(51) Int. Cl.
*G02F 1/13357* (2006.01)
*G02F 1/1335* (2006.01)
*G02F 1/1333* (2006.01)
*G09G 3/36* (2006.01)
*G09G 3/34* (2006.01)

(52) U.S. Cl.
CPC .. *G02F 1/133603* (2013.01); *G02F 1/133308* (2013.01); *G09G 3/3426* (2013.01); *G09G 3/3648* (2013.01); *G02F 2001/133317* (2013.01)

(58) Field of Classification Search
CPC ............ G02F 1/133603; G09G 3/3463; G09G 3/3426
USPC ................... 362/97.1, 97.2; 349/63
See application file for complete search history.

(56) References Cited

U.S. PATENT DOCUMENTS

| | | | | |
|---|---|---|---|---|
| 2006/0087866 A1* | 4/2006 | Ng | ............... | G02F 1/133603 362/612 |
| 2006/0203465 A1* | 9/2006 | Chang | ............... | G02F 1/133603 362/23.18 |
| 2007/0170443 A1* | 7/2007 | Lee | ............... | G02F 1/133603 257/85 |
| 2014/0146522 A1* | 5/2014 | Song | ............... | G09F 13/04 362/97.1 |
| 2018/0166002 A1 | 6/2018 | Sako et al. | | |

FOREIGN PATENT DOCUMENTS

JP       2012078699 A    4/2012
JP        201897203 A    6/2018

\* cited by examiner

*Primary Examiner* — Karabi Guharay
(74) *Attorney, Agent, or Firm* — K&L Gates LLP

(57) ABSTRACT

According to an aspect, a display device includes: a display panel having a display area including a plurality of pixels; and an illuminator provided so as to overlap the display panel and configured to illuminate the display area. The illuminator has a plurality of segment blocks set in different positions in the display area. Each of the segment blocks is provided such that the luminance of the segment block is individually controlled. At least one of the segment blocks satisfies a predetermined condition. The predetermined condition is such that at least two light source rows each including a plurality of light sources arranged in a first direction are arranged in a second direction intersecting the first direction, and that none of the light sources included in the two light source rows adjacent in the second direction are in the same straight line along the second direction.

8 Claims, 11 Drawing Sheets

DISPLAY DEVICE WITH AN ILLUMINATOR HAVING PLURALITY OF SEGMENT BLOCKS

CROSS-REFERENCE TO RELATED APPLICATIONS

This application claims priority from Japanese Application No. 2017-198039, filed on Oct. 11, 2017, the contents of which are incorporated by reference herein in its entirety.

BACKGROUND

1. Technical Field

The present disclosure relates to a display device.

2. Description of the Related Art

Display devices are known (for example, in Japanese Patent Application Laid-open Publication No. 2012-78699 (JP-A-2012-78699)), each including a backlight capable of controlling luminance of light emitted from a plurality of light sources for illuminating different positions on a display panel on a light source-by-light source basis according to brightness of a displayed image, and thus performing what is called local dimming.

In the backlight of JP-A-2012-78699, the light sources each serving as a unit of controlling the luminance of light are arranged in a matrix (row-column configuration). Such light sources are arranged on the assumption of illuminating a rectangular display area. Consequently, under conditions not assumed for the backlight of JP-A-2012-78699, such as in the case of using a non-rectangular display panel in which, for example, a display area other than a rectangular area is illuminated, the backlight of JP-A-2012-78699 having the light sources arranged in a matrix is difficult to be employed without modification.

SUMMARY

According to an aspect, a display device includes: a display panel having a display area including a plurality of pixels; and an illuminator provided so as to overlap the display panel and configured to illuminate the display area. The illuminator has a plurality of segment blocks set in different positions in the display area. Each of the segment blocks is provided such that luminance of the segment block is individually controlled. At least one of the segment blocks satisfies a predetermined condition. The predetermined condition is such that at least two light source rows each including a plurality of light sources arranged in a first direction are arranged in a second direction intersecting the first direction, and that none of the light sources included in the two light source rows adjacent in the second direction are in the same straight line along the second direction.

DETAILED DESCRIPTION

Figure 1:
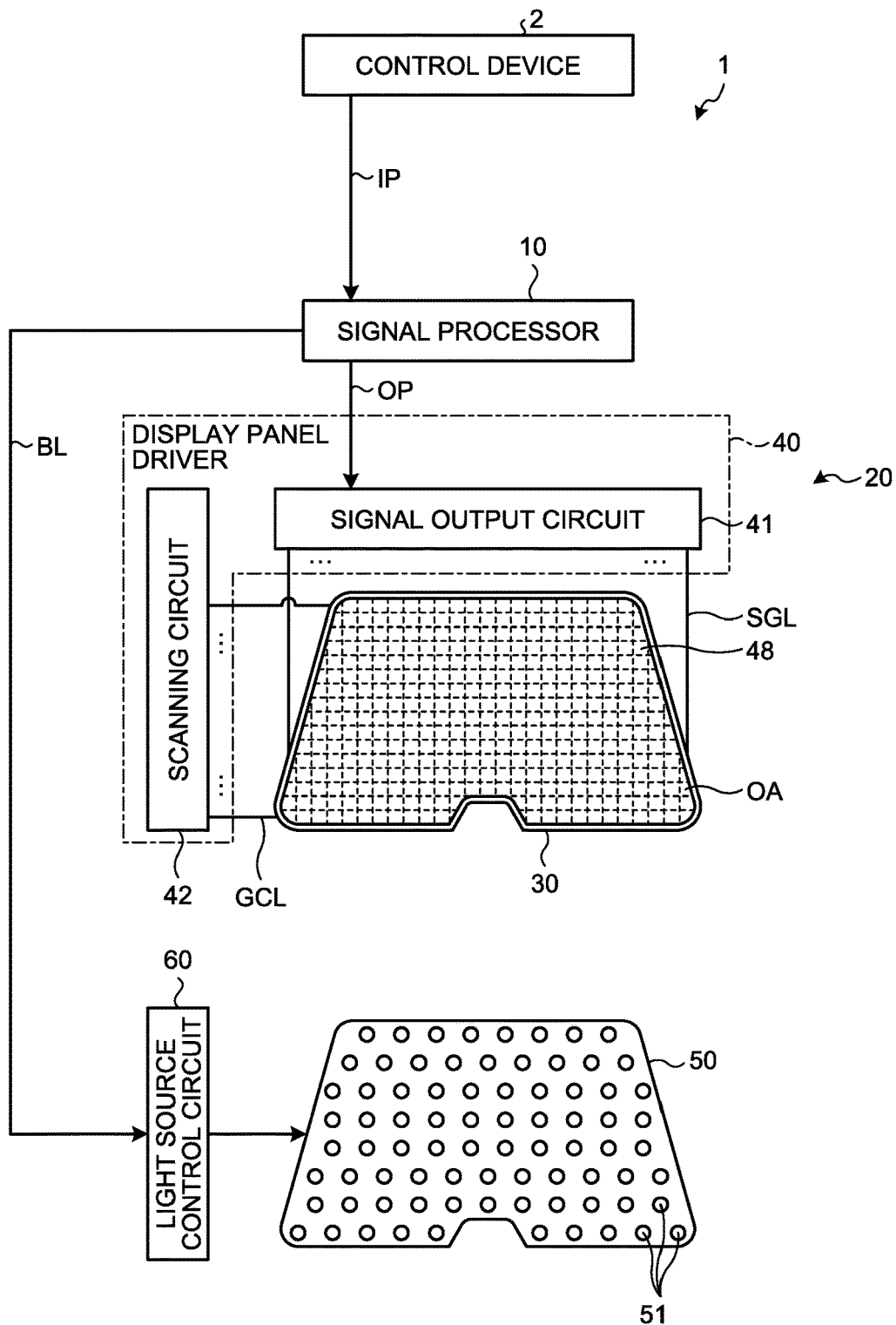
FIG. 1 is a diagram illustrating an exemplary main configuration of a display device according to an embodiment of the present invention.

The following describes an embodiment of the present invention with reference to the drawings. What is disclosed herein is merely an example, and the present invention naturally encompasses appropriate modifications easily conceivable by those skilled in the art while maintaining the gist of the invention. To further clarify the description, widths, thicknesses, shapes, and the like of various parts are schematically illustrated in the drawings as compared with actual aspects thereof, in some cases. However, they are merely examples, and interpretation of the present invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

FIG. 1 is a diagram illustrating an exemplary main configuration of a display device 1 according to the embodiment of the present invention. The display device 1 of this embodiment includes a signal processor 10, a display unit 20, an illuminator 50, and a light source control circuit 60. The signal processor 10 performs various output operations based on input signals IP received from an external control device 2, and controls operations of the display unit 20 and the illuminator 50. The input signals IP serve as data for outputting an image for display on the display device 1, and are, for example, red-green-blue (RGB) image signals. The signal processor 10 outputs output signals OP generated based on the input signals IP to the display unit 20. After receiving the input signals IP, the signal processor 10 outputs light source drive signals BL for controlling lighting amounts of respective light sources 51 included in the illuminator 50 (refer to FIG. 5) to the light source control circuit 60. The light source control circuit 60 is, for example, a driver circuit for lighting up the light sources 51 included in the illuminator 50, and operates the illuminator 50 according to the light source drive signals BL.

The display unit 20 includes a display panel 30 and a display panel driver 40. The display panel 30 includes a display area OA provided with a plurality of pixels 48. The pixels 48 are arranged, for example, in a matrix (row-column configuration) in the display area OA of the display panel 30 having a trapezoidal shape, which will be described later. The display panel 30 of this embodiment is a liquid crystal image display panel. The shape of the display panel 30 illustrated in FIG. 1 represents an exemplary shape and a schematic shape thereof. The display panel driver 40 includes a signal output circuit 41 and a scanning circuit 42. The signal output circuit 41 drives the pixels 48 according to the output signals OP. The scanning circuit 42 outputs a scan signal for scanning the pixels 48 arranged in a matrix in units of a predetermined number of rows (e.g. row by row). The pixels 48 are driven so as to output gradation values corresponding to the output signals OP at the time when the drive signal is output.

Figure 2:
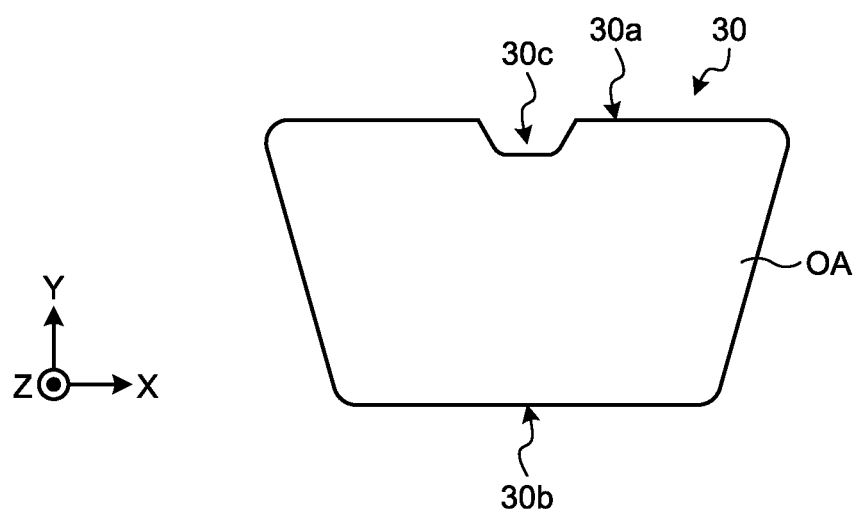
FIG. 2 is a diagram illustrating an exemplary planar shape of a display panel.

FIG. 2 is a diagram illustrating an exemplary planar shape of the display panel 30. In the description of this embodiment, the X-direction denotes one direction along a display surface of the display panel 30; the Y-direction denotes a direction along the display surface of the display panel 30 and orthogonal to the X-direction; and the Z-direction denotes a direction orthogonal to the X-direction and the Y-direction. In the description of this embodiment, what is simply called the planar shape refers to an XY-planar shape. The pixels 48 are arranged in a matrix (row-column configuration) along the X-direction and the Y-direction.

The display panel 30 and the display area OA of this embodiment have the planar shape other than a rectangular shape along a first direction (such as the X-direction) and a second direction (such as the Y-direction). Specifically, the planar shape of the display panel 30 is a trapezoidal shape, as illustrated, for example, in FIG. 2. Specifically, the display panel 30 has a trapezoidal planar shape with four rounded apexes. The display panel 30 of this embodiment has a recess 30c provided near the center of a long side 30a along the X-direction. The long side 30a is one of two sides provided parallel and opposed to each other among four sides of the display panel 30 and is longer than a short side 30b serving as the other of the two sides. The display panel and the display area OA illustrated in FIG. 2 are mere examples. The shape of the display panel and the display area of this embodiment is not limited to the shape illustrated in FIG. 2.

Figure 3:
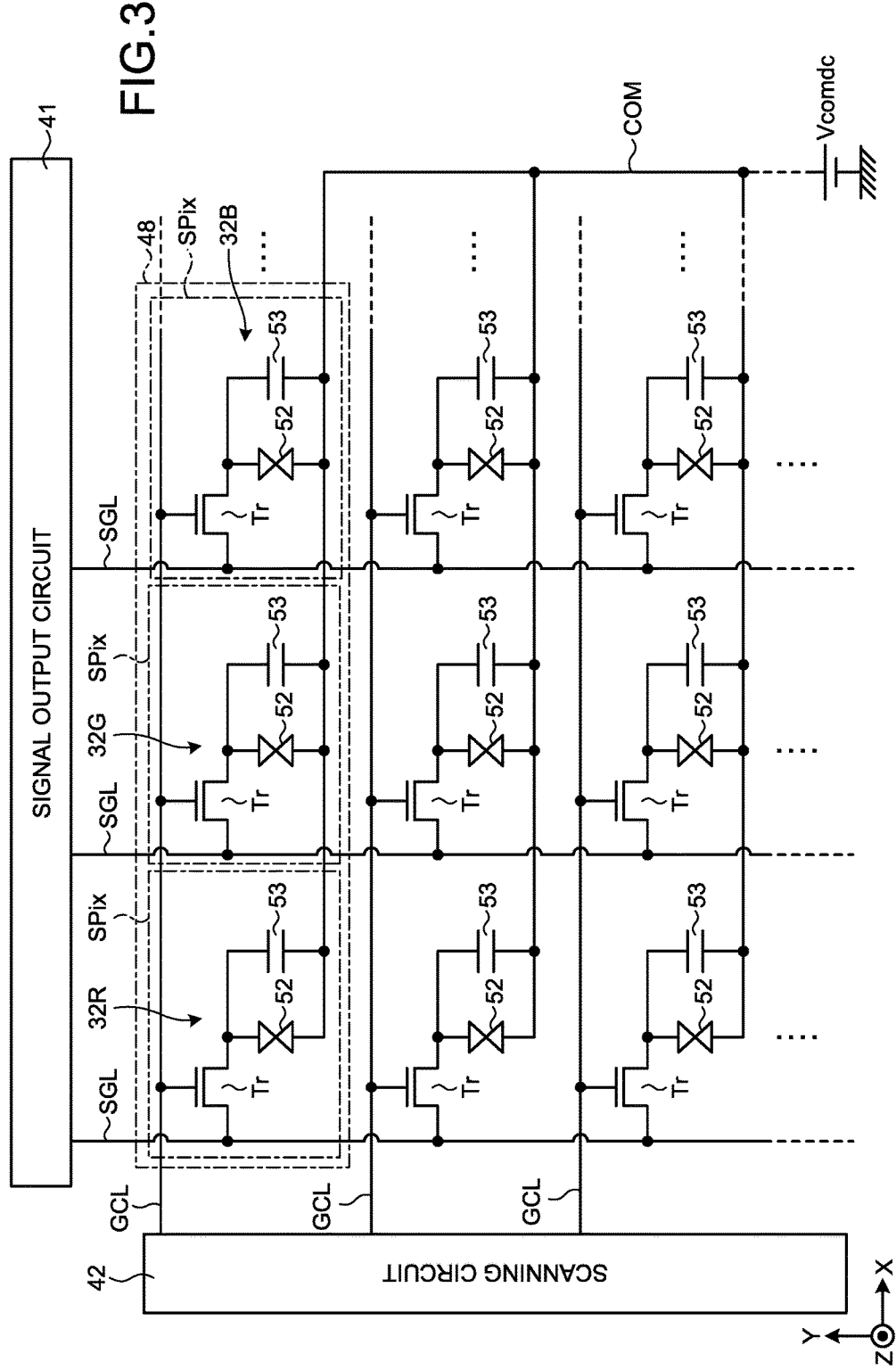
FIG. 3 is a circuit diagram illustrating an exemplary pixel array provided on the display panel.

FIG. 3 is a circuit diagram illustrating an exemplary pixel array provided on the display panel 30. A pixel substrate included in the display panel 30 is provided with switching elements Tr of respective sub-pixels SPix and wiring, such as signal lines SGL that supply pixel signals to pixel electrodes and gate lines GCL that supply drive signals for driving the switching elements Tr. The gate lines GCL and the signal lines SGL are provided so as to intersect each other. The display area is divided into a plurality of parts in a matrix having a row-column configuration by the gate lines GCL and the signal lines SGL. Each part corresponds to one sub-pixel SPix.

The display panel 30 includes the sub-pixels SPix arranged in a matrix (row-column configuration). Each of the sub-pixels SPix includes a corresponding one of the switching elements Tr, a liquid crystal element 52, and a retention capacitor 53. The sub-pixel SPix is provided with a corresponding one of the pixel electrodes, and the pixel electrode is coupled to the switching element Tr. The switching element Tr is fabricated from a thin-film transistor (TFT), and in this example, fabricated from an n-channel metal oxide semiconductor (MOS) TFT. The liquid crystal element 52 includes liquid crystal capacitance generated between the pixel electrode and a common electrode COM. The common electrode COM is, for example, a plate-like electrode provided in the display area OA and shared by the sub-pixels SPix. Capacitance generated between the pixel electrode and another electrode different from the common electrode COM can be used as the retention capacitor 53. The other electrode is individually provided in the sub-pixel SPix. A capacitive element may be provided as the retention capacitor 53.

The gate lines GCL are coupled to the scanning circuit 42. The scanning circuit 42 sequentially selects the gate lines GCL. The scanning circuit 42 applies the scan signal to the gates of the switching elements Tr through the selected one of the gate lines GCL. This operation sequentially selects one row (one horizontal line) of the sub-pixels SPix as a target of display driving. The signal lines SGL are coupled to the signal output circuit 41. The signal output circuit 41 supplies pixel signals Vpix to the sub-pixels SPix included in the selected one horizontal line through the signal lines SGL. These sub-pixels SPix perform display of each horizontal line according to the supplied pixel signals Vpix.

When a display operation is performed, a display drive signal Vcomdc is applied to the common electrode COM. As a result, the common electrode COM serves as an electrode that exhibits a reference potential relative to a potential of the pixel electrode during the display operation. The orientation of the liquid crystal element 52 is controlled according to the potential difference between the pixel electrode and the common electrode COM, and thereby, each of the sub-pixels SPix is controlled in transmittance of light. The common electrode COM may be made up of a single electrode or a plurality of electrodes.

Color regions 32R, 32G, and 32B of three colors of R, G, and B are associated as a set with the sub-pixels SPix illustrated in FIG. 3. In this embodiment, the sub-pixels SPix associated with the three color regions 32R, 32G, and 32B constitute, as a set, each of the pixels 48. In the description of this embodiment, the number and the combination of colors of the sub-pixels SPix constituting each of the pixels 48 are mere examples and not limited thereto, and can be changed as appropriate. For example, a sub-pixel SPix of white (W) may be provided as one of the sub-pixels SPix included in each of the pixels 48.

Figure 4:
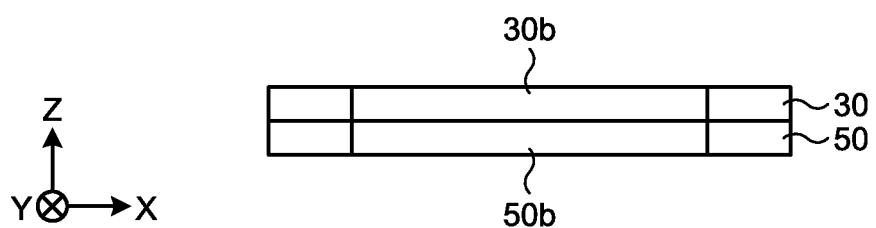
FIG. 4 is a schematic diagram illustrating a multi-layered structure of the display panel and an illuminator.

FIG. 4 is a schematic diagram illustrating a multi-layered structure of the display panel 30 and the illuminator 50. FIG. 4 illustrates the multi-layered structure as viewed from the short side 30b of the display panel 30. As illustrated in FIG. 4, the display panel 30 and the illuminator 50 are provided so as to overlap each other in the X-direction and Y-direction (in X-Y plan view). Hereinafter, a side of the display panel 30 opposed to the illuminator 50 is referred to as a back surface side, and the opposite side thereof is referred to as a display surface side. The illuminator 50 emits light so as to illuminate the display panel 30 from the back surface side. The display panel 30 displays the image by driving each of the sub-pixels SPix to individually control the level of transmission of the light emitted from the illuminator 50 from the back surface side to the display surface side for each of the sub-pixels SPix. In this manner, the illuminator 50 of this embodiment illuminates the display area OA.

Figure 5:
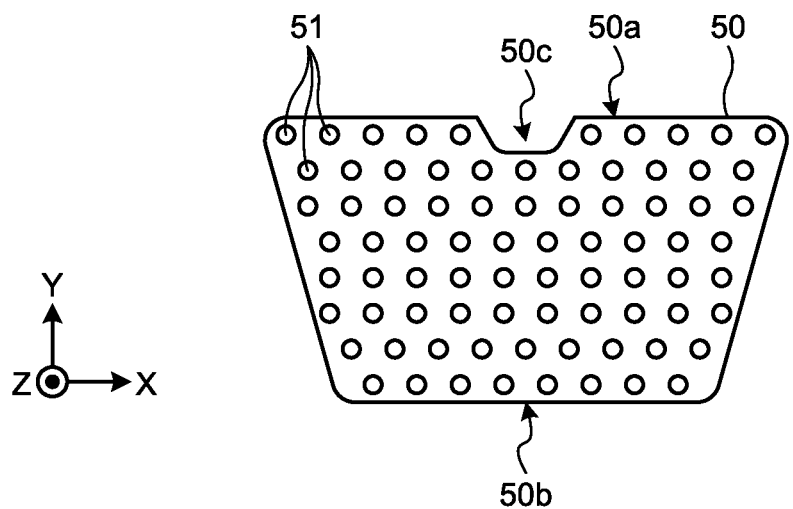
FIG. 5 is a diagram illustrating an exemplary planar shape of the illuminator.

FIG. 5 is a diagram illustrating an exemplary planar shape of the illuminator 50. The planar shape of the illuminator 50 is the same as that of the display panel 30. In other words, the shape of the illuminator 50 illustrated in FIG. 1 represents an exemplary shape thereof. Thus, the illuminator 50 of this embodiment has the planar shape other than a rectangular shape along the first direction and the second direction.

Figure 6:
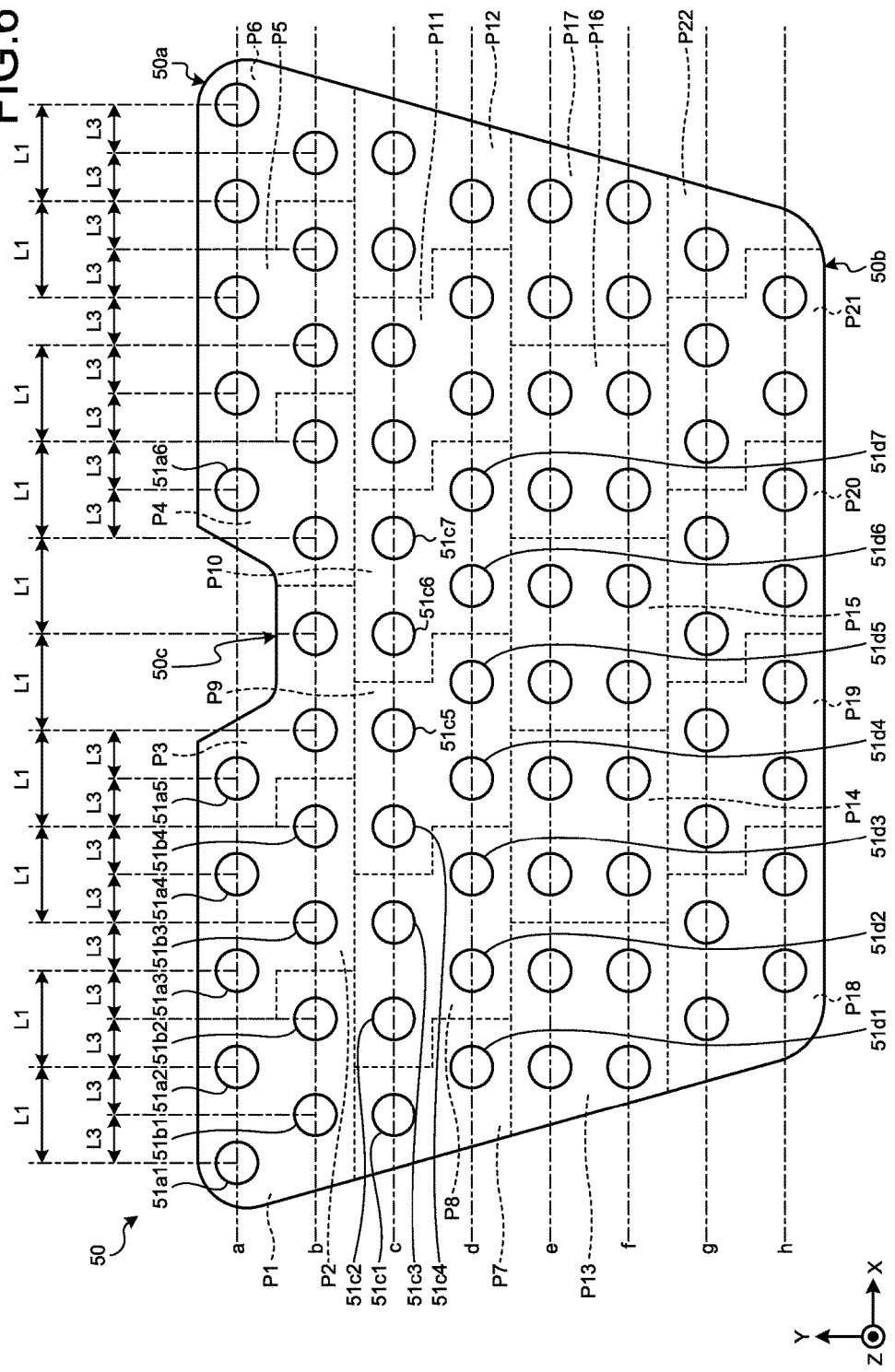
FIG. 6 is a diagram illustrating an example of an arrangement of a plurality of light sources and setting of a plurality of segment blocks in the illuminator.

FIG. 6 is a diagram illustrating an example of an arrangement of the light sources 51 and setting of a plurality of segment blocks in the illuminator 50. As illustrated in FIGS. 5 and 6, the illuminator 50 includes the light sources 51. Specifically, each of the light sources 51 is, for example, a light-emitting diode (LED) that emits white light. The illuminator 50 has light source rows, each with more than one of the light sources 51 arranged in the first direction. The light source rows are arranged parallel to one another in the second direction.

In the following description, the light source rows are distinguished from one another using coordinates a, b, c, d, e, f, g, and h in the Y-direction assigned in FIG. 6, in some cases. Specifically, the coordinates a, b, c, d, e, f, g, and h in the Y-direction are sequentially assigned to the light source rows from a long side 50a toward a short side 50b of the illuminator 50. In FIG. 6, to distinguish the positions in which the light sources 51 are provided, each of the light sources 51 is assigned with a symbol including a symbol indicating a coordinate in the Y-direction and a number indicating a coordinate in the X-direction. For example, a light source 51a1 is included in a light source row having a coordinate "a" in the Y-direction and is the first one when counted from one end side in the X-direction (left side in FIG. 6). Also, a light source 51b2 is included in a light source row having a coordinate "b" in the Y-direction and is the second one when counted from the one end side in the X-direction. In FIG. 6, the light sources 51 are assigned with symbols under the same rule.

In this embodiment, the light sources 51 have the same shape and size regardless of the arrangement thereof. Specifically, the planar shape of each of the light sources 51 is circular, as illustrated in FIGS. 5 and 6 and other figures. In this embodiment, the light source rows having the coordinates a, b, c, d, e, f, g, and h are arranged parallel to one another at even intervals in the Y-direction.

The illuminator 50 has segment blocks (such as segment blocks P1, P2, . . . , and P22) set in different positions in the display area OA. FIG. 6 exemplifies the illuminator 50 in which the segment blocks P1, P2, . . . , and P22 are set. One or more of the light sources 51 is/are disposed in each of the segment blocks. For example, the light source 51a1, a light source 51a2, a light source 51b1, and the light source 51b2 are disposed in the segment block P1. Also, a light source 51a3, a light source 51a4, a light source 51b3, and a light source 51b4 are disposed in the segment block P2. The segment blocks are provided such that the luminance levels thereof are individually controlled. The mechanism of luminance control for each of the segment blocks will be described later.

In at least one of the segment blocks, at least two light source rows each including more than one of the light sources 51 arranged in the first direction are arranged in the second direction intersecting the first direction. For example, the segment block P1 includes the light sources 51a1 and 51a2 included in the light source row having the coordinate a and the light sources 51b1 and 51b2 included in the light source row having the coordinate b. In other words, in the segment block P1, a light source row in which the light sources 51a1 and 51a2 are arranged in the X-direction and a light source row in which the light sources 51b1 and 51b2 are arranged in the X-direction are arranged in the Y-direction. The light source row in which the light sources 51a1 and 51a2 are arranged in the X-direction is a part of the light source row having the coordinate a. The light source row in which the light sources 51b1 and 51b2 are arranged in the X-direction is a part of the light source row having the coordinate b.

In at least one of the segment blocks, none of the light sources 51 included in the two light source rows adjacent in the second direction are in the same straight line along the second direction. For example, the position in the X-direction of the light source 51b1 in the segment block P1 is an intermediate position between the position in the X-direction of the light source 51a1 and the position in the X-direction of the light source 51a2. Specifically, if a dividing line that halves, in the X-direction, a distance L1 between the center in the X-direction of the light source 51a1 and the center in the X-direction of the light source 51a2 is extended along the Y-direction, the center of the light source 51b1 is located in the dividing line. The center of the light source 51b1 is displaced from the center of the light source 51a1 in the Y-direction, and hence, may not be located in the dividing line. A distance L3 between the dividing line and the center in the X-direction of the light source 51a1 is equal to the distance L3 between the dividing line and the center in X-direction of the light source 51a2. As described above, in this embodiment, in any one of the segment blocks satisfying a predetermined condition, one of the light sources 51 included in one of the two light source rows adjacent in the second direction is located on a straight line intersecting the first direction at right angles in the intermediate position between the two light sources 51 adjacent in the first direction in the other of the two light source rows. The position in the X-direction of the light source 51b2 in the segment block P1 is displaced by the distance L3 from the position in the X-direction of the light source 51a2 toward the other end side in the X-direction (right side in FIG. 6). In this manner, in this embodiment, in any one of the segment blocks satisfying the predetermined condition, the light sources 51 included in the two light source rows adjacent in the second direction are arranged in a staggered manner.

When the predetermined condition is such that at least two light source rows each including more than one of the light sources 51 arranged in the first direction are arranged in the second direction intersecting the first direction, and that none of the light sources 51 included in the two light source rows adjacent in the second direction are in the same straight line along the second direction, at least one of the segment blocks satisfies the predetermined condition. In the example illustrated in FIG. 6, the segment blocks P1, P2, P5, P8, P9, P10, P11, P18, P19, P20, and P21 satisfy the predetermined condition.

When boundary lines between adjacent segment blocks satisfying the predetermined condition are considered to be outer borders of the segment blocks, the shapes of the outer borders of the segment blocks satisfying the predetermined condition are not necessarily rectangular. For example, as illustrated in FIG. 6, boundary lines of the segment block P9 with the segment block P8 and the segment block P10 adjacent in the X-direction to the segment block P9 are step-like. Consequently, the shape of the outer border of the segment block P9 illustrated in FIG. 6 is polygonal with both ends in the X-direction being step-like. However, the step-like boundary lines illustrated in FIG. 6 are merely conceptual, and the boundary lines of the segment blocks are not limited thereto. For example, the boundary line between the segment block P8 and the segment block P9 may be an oblique straight line demarcating a light source 51d3 and a light source 51c3 in the segment block P8 from a light source 51c4 and a light source 51d4 in the segment block P9. The oblique straight line refers to a straight line that intersects the X-direction and the Y-direction in the XY-plane.

As described above, more than one of the light sources 51 are arranged along the first direction in each of the light source rows. In other words, in this embodiment, the light sources 51 included in two light source rows adjacent in the first direction among the light source rows in the segment blocks are located in the same straight line along the first direction. Specifically, as illustrated, for example, in FIG. 6, a line connecting together the centers of the light sources 51 included in one light source row is one straight line along the X-direction.

In this embodiment, the interval in the first direction between the light sources 51 is the same in each of the light source rows in the segment blocks satisfying the predetermined condition. For example, in the segment block P1, the distance L1 between the centers of the light sources 51a1 and 51a2 is twice the distance L3 obtained by halving the distance L1. Also, the distance between the centers of the light sources 51b1 and 51b2 is twice the distance L3. In this embodiment, the light sources 51 have circular planar shapes of the same size. Therefore, the center-to-center distance in the X-direction between the light sources 51 is the same in each of the light source rows, which indicates that the interval in the X-direction between the light sources 51 is the same in each of the light source rows. Thus, in the segment block P1, the light source row in which the light sources 51a1 and 51a2 are arranged in the X-direction has the same interval in the X-direction between the light sources 51 as that of the light source row in which the light sources 51b1 and 51b2 are arranged in the X-direction.

In this embodiment, the interval in the first direction between the light sources 51 is the same in each of the light source rows having the coordinates b, c, d, e, f, g, and h. For example, as illustrated in FIG. 6, the center-to-center distance in the X-direction between the light sources 51 included in the light source row having the coordinate b is the distance L1 (distance twice the distance L3). Although not illustrated in any of the drawings, the interval in the first direction between the light sources 51 included in each of the light source rows having the coordinates c, d, e, f, g, and h also corresponds to the distance L1 (distance twice the distance L3). The interval in the first direction between the light sources 51 included in the light source row having the coordinate a corresponds to the distance L1 (distance twice the distance L3), except an interval between light sources 51a5 and 51a6 where a recess 50c is provided. The center-to-center distance between the light sources 51 (interval between the light sources 51a5 and 51a6) where the recess 50c is provided, is an integral multiple of the center-to-center distance (distance L1) between the other light sources 51 (such as three times the distance L1).

In this embodiment, at least one of the segment blocks does not satisfy the predetermined condition. In the example illustrated in FIG. 6, the segment blocks P3, P4, P6, P7, P12, P13, P14, P15, P16, P17, and P22 do not satisfy the predetermined condition. Specifically, in each of the segment blocks P3, P4, P6, P7, P12, and P22, the number of light source rows in which more than one of the light sources 51 are arranged in the X-direction is less than two. In each of the segment blocks P13, P14, P15, P16, and P17, the light sources 51 included in two adjacent light source rows are in the same straight lines along the second direction.

Figure 7:
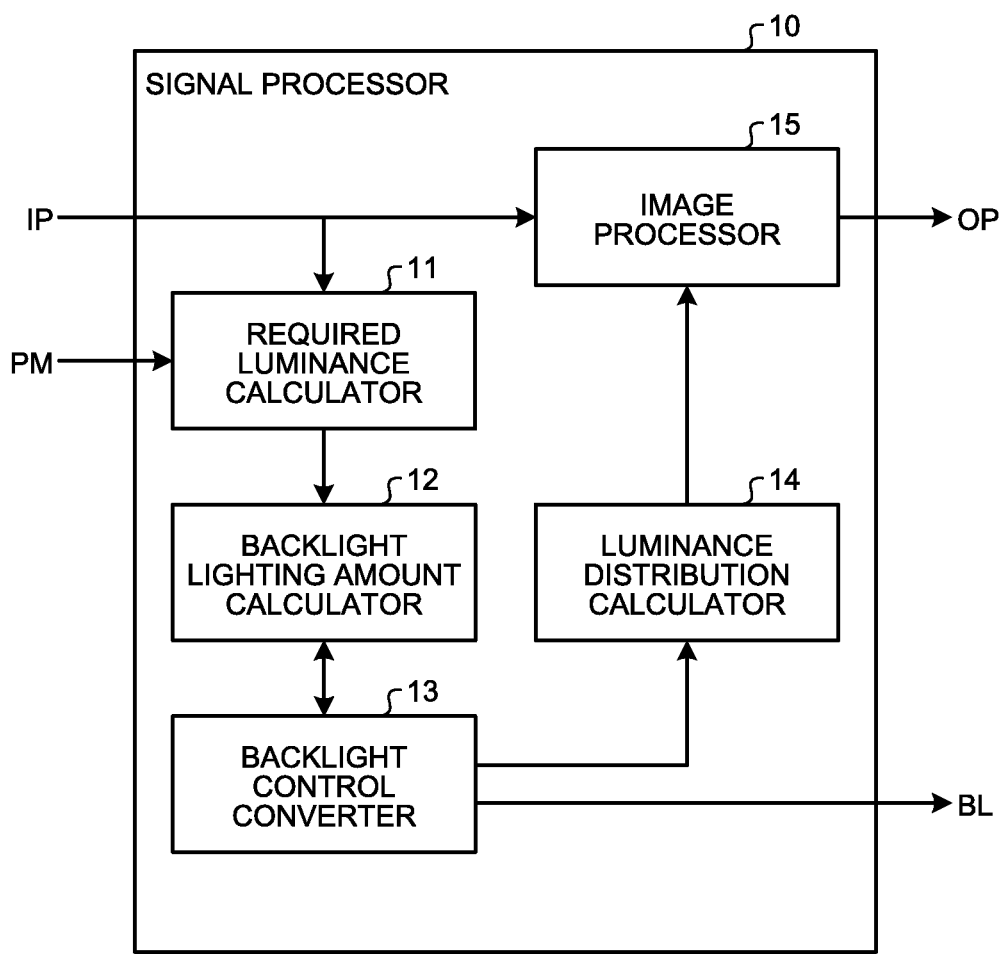
FIG. 7 is a block diagram illustrating an exemplary functional configuration of a signal processor.

FIG. 7 is a block diagram illustrating an exemplary functional configuration of the signal processor 10. The signal processor 10 is a circuit that has functions of, for example, a required luminance calculator 11, a backlight lighting amount calculator 12, a backlight control converter 13, a luminance distribution calculator 14, and an image processor 15.

Figure 8:
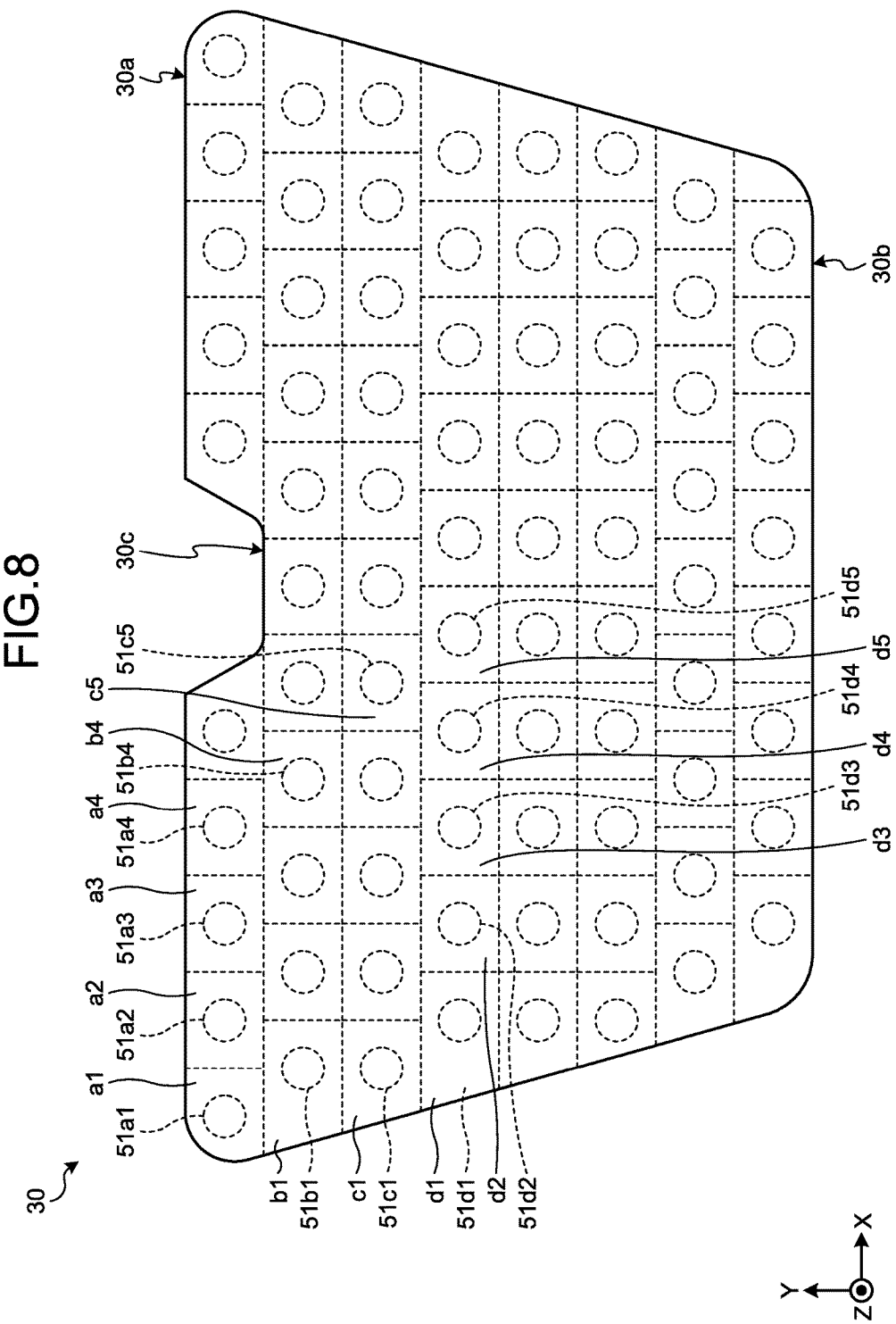
FIG. 8 is a schematic diagram illustrating a relation between the light sources and dividing lines dividing a display area into a plurality of logical blocks, required luminance being calculated by a required luminance calculator for each of the logical blocks.

FIG. 8 is a schematic diagram illustrating a relation between the light sources 51 and dividing lines dividing the display area OA into a plurality of logical blocks, required luminance being calculated by the required luminance calculator 11 for each of the logical blocks. The required luminance calculator 11 calculates the luminance of light required for the display output of the image corresponding to the input signals IP on a logical block-by-logical block basis. Specifically, as illustrated, for example, in FIG. 8, the display area OA including the pixels is divided into the logical blocks. One or more of the pixels is/are disposed in each of the logical blocks. The required luminance calculator 11 identifies, from among the pixels included in each of the logical blocks, a pixel for which the highest luminance of light is required for the display output corresponding to the input signals IP. The required luminance calculator 11 calculates the luminance of light required for the identified pixel as luminance of light required for the logical block. The required luminance calculator 11 individually calculates the luminance of light required for each of the logical blocks. Data representing the relation between the logical blocks and the pixels is, for example, installed in the signal processor 10 in a form capable of being referenced by the required luminance calculator 11. This is, however, a mere example of a method of management of the data, which is not limited to this example. The data representing the relation between the logical blocks and the pixels 48 may be received, for example, as some of parameters PM from the control device 2.

FIG. 8 illustrates an example in which the logical blocks are set such that each of the logical blocks overlaps a corresponding one of the light sources 51. In FIG. 8, symbols assigned to the logical blocks correspond to the "symbols indicating coordinates in the Y-direction and numbers indicating coordinates in the X-direction" in the symbols assigned to the light sources 51. For example, a logical block a1 overlaps the light source 51a1.

The backlight lighting amount calculator 12 calculates the lighting amount of each of the light sources 51 corresponding to the luminance of light required for the logical block calculated by the required luminance calculator 11. The backlight lighting amount calculator 12 calculates the lighting amount of each of the light sources 51 overlapping a corresponding one of the logical blocks. Data representing a relation between the luminance of light required for the logical block and the lighting amount of the light source 51 is, for example, installed in the signal processor 10 in a form capable of being referenced by the backlight lighting amount calculator 12.

Figure 9:
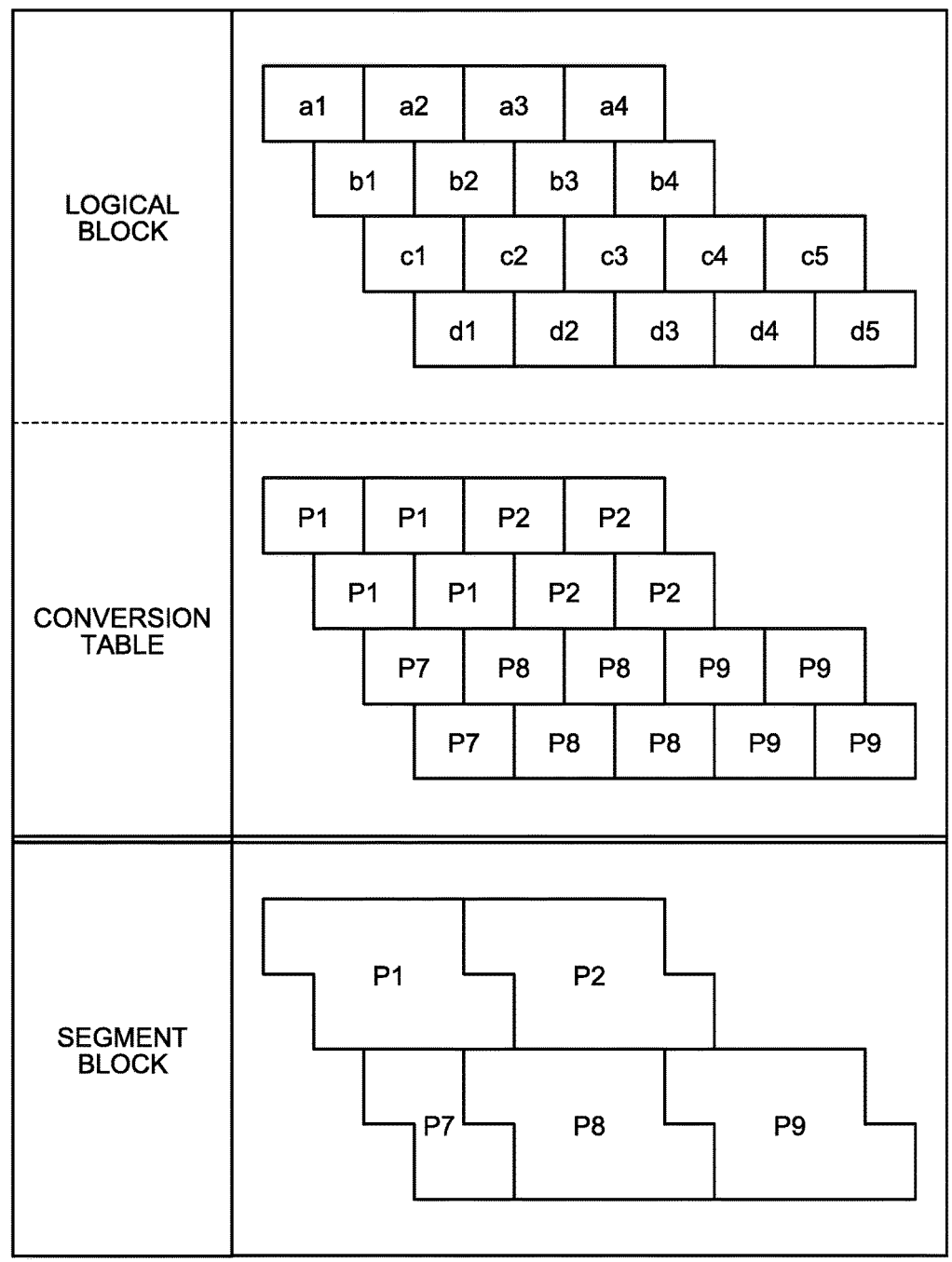
FIG. 9 is a diagram illustrating an example of data represented by a conversion table for associating the logical blocks with the segment blocks.

FIG. 9 is a diagram illustrating an example of data represented by a conversion table for associating the logical blocks with the segment blocks. The backlight control converter 13 outputs the light source drive signals BL for controlling the lighting amounts of the light sources 51 on a segment block-by-segment block basis based on the calculation result by the backlight lighting amount calculator 12. Specifically, the backlight control converter 13 refers to the conversion table illustrated, for example, in FIG. 9 and reads the lighting amounts of the light sources 51 calculated on a logical block-by-logical block basis as information for determining the lighting amounts of the light sources 51 in any one of the segment blocks.

For example, as illustrated in FIG. 8, the light source 51a1 overlaps the logical block a1. The light source 51a2 overlaps a logical block a2. The light source 51b1 overlaps a logical block b1. The light source 51b2 overlaps a logical block b2. As illustrated in FIG. 6, the light sources 51a1, 51a2, 51b1, and 51b2 are disposed in the segment block P1. Therefore, the conversion table illustrated in FIG. 9 associates the logical blocks a1, a2, b1, and b2 with the segment block P1. Based on the same mechanism, the conversion table associates logical blocks overlapping the light sources 51 included in a segment block with the segment block. For example, the conversion table associates logical blocks a3, a4, b3, and b4 with the segment block P2. The conversion table associates logical blocks c1 and d1 with the segment block P7. The conversion table associates logical blocks c2, c3, d2, and d3 with the segment block P8. The conversion table associates logical blocks c4, c5, d4, and d5 with the segment block P9. In addition, although not illustrated in FIG. 9, the conversion table associates the other logical blocks (refer to FIG. 8) with segment blocks each including the light sources 51 overlapping corresponding ones of the logical blocks (refer to FIG. 6). The conversion table is, for example, installed in the signal processor 10 in a form capable of being referenced by the backlight control converter 13.

The backlight control converter 13 of this embodiment performs a predetermined processing for each of the segment blocks. In the processing, the backlight control converter 13 employs the highest lighting amount from among the lighting amounts of the light sources 51 overlapping the respective logical blocks included in the segment block as the lighting amount of the segment block. The backlight lighting amount calculator 12 of this embodiment performs a predetermined processing for each of the segment blocks. In the processing, the backlight lighting amount calculator 12 reflects the lighting amounts of the light sources 51 overlapping the respective logical blocks included in the segment block into the logical blocks in the segment block. Hereinafter, the lighting amount of the light source 51 overlapping the logical block is referred to as the lighting amount of the logical block, in some cases.

Figure 10:
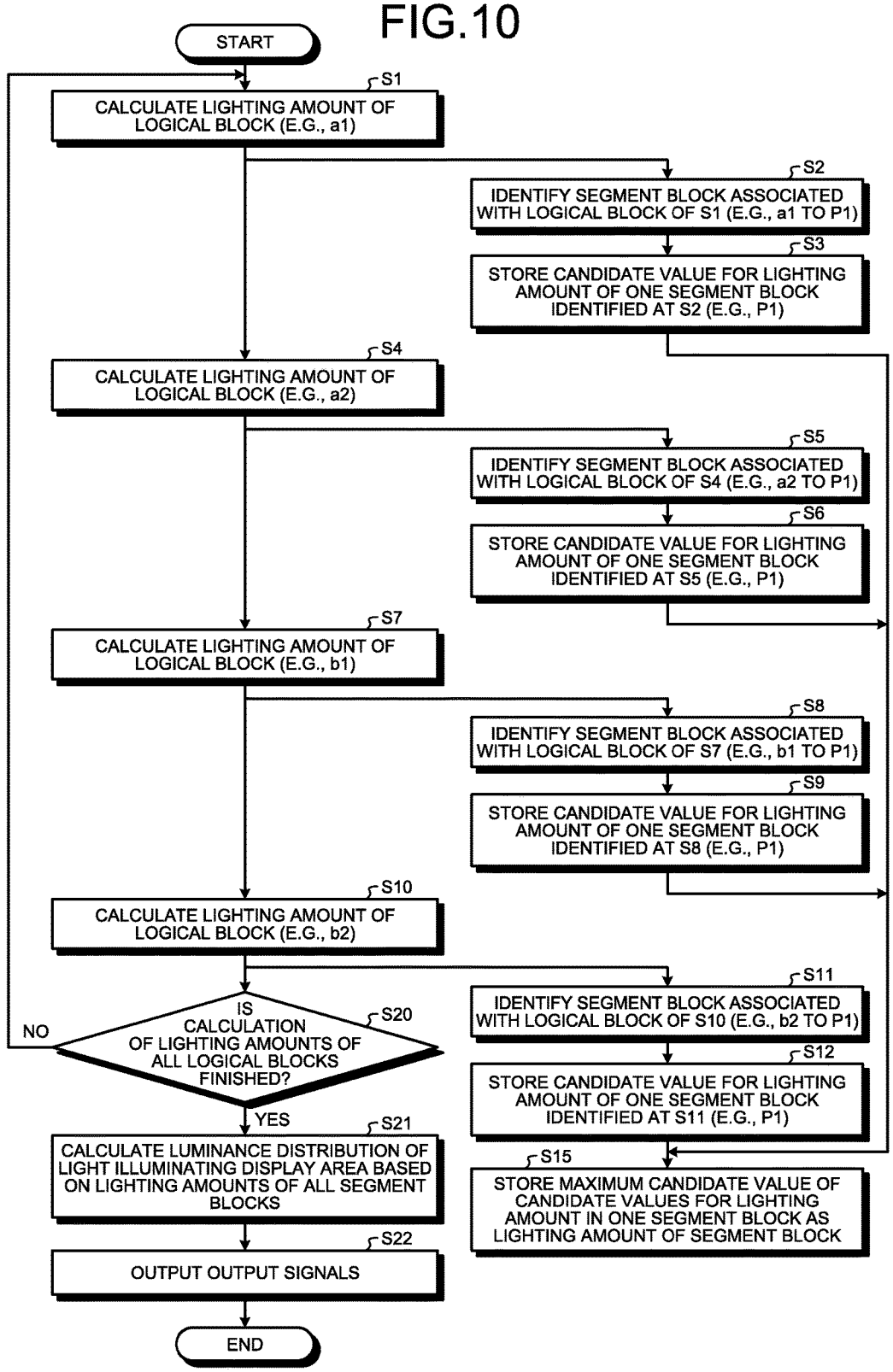
FIG. 10 is an exemplary flowchart of processing on the logical blocks associated with one of the segment blocks.

FIG. 10 is an exemplary flowchart of processing on the logical blocks associated with one of the segment blocks. FIG. 10 exemplifies a relation of first determination processing to conversion processing and second determination processing. In the first determination processing, the backlight lighting amount calculator 12 determines the lighting amount on a logical block-by-logical block basis. In the conversion processing, the backlight control converter 13 converts from the logical blocks to the segment blocks. In the second determination processing, the backlight control converter 13 determines the lighting amount on a segment block-by-segment block basis.

For example, the backlight lighting amount calculator 12 calculates the lighting amount of one of the logical blocks (Step S1). With reference to the conversion table, the backlight control converter 13 identifies a segment block associated with the logical block for which the lighting amount has been determined by the processing at Step S1 (Step S2). The backlight control converter 13 stores the lighting amount calculated by the processing at Step S1 as a candidate value for the lighting amount of the segment block identified by the processing at Step S2 (Step S3).

The backlight lighting amount calculator 12 calculates the lighting amount of the next logical block (Step S4). With reference to the conversion table, the backlight control converter 13 identifies the segment block associated with the logical block for which the lighting amount has been determined by the processing at Step S4 (Step S5). The backlight control converter 13 stores the lighting amount calculated by the processing at Step S4 as a candidate value for the lighting amount of the segment block identified by the processing at Step S5 (Step S6).

The backlight lighting amount calculator 12 calculates the lighting amount of the next logical block (Step S7). With reference to the conversion table, the backlight control converter 13 identifies the segment block associated with the logical block for which the lighting amount has been determined by the processing at Step S7 (Step S8). The backlight control converter 13 stores the lighting amount calculated by the processing at Step S7 as a candidate value for the lighting amount of the segment block identified by the processing at Step S8 (Step S9).

The backlight lighting amount calculator 12 calculates the lighting amount of the next logical block (Step S10). With reference to the conversion table, the backlight control converter 13 identifies the segment block associated with the logical block for which the lighting amount has been determined by the processing at Step S10 (Step S11). The backlight control converter 13 stores the lighting amount calculated by the processing at Step S10 as a candidate value for the lighting amount of the segment block identified by the processing at Step S11 (Step S12).

The backlight lighting amount calculator 12 compares the candidate values for the lighting amount in the same one segment block that have been stored by the processing at Steps S3, S6, S9, and S12. The maximum value of the candidate values for the lighting amount in the same one segment block is stored as the lighting amount of the segment block (Step S15).

The above-mentioned processing will be more specifically described by exemplifying the logical blocks a1, a2, b1, and b2 in the segment block P1. The backlight lighting amount calculator 12 calculates the lighting amount of the logical block a1 (Step S1). With reference to the conversion table, the backlight control converter 13 identifies the segment block P1 associated with the logical block a1 (Step S2). The backlight control converter 13 stores the lighting amount calculated by the processing at Step 51 as a candidate value 1 for the lighting amount of the segment block P1 identified by the processing at Step S2 (Step S3).

The backlight lighting amount calculator 12 calculates the lighting amount of the next logical block a2 (Step S4). With reference to the conversion table, the backlight control converter 13 identifies the segment block P1 associated with the logical block a2 (Step S5). The backlight control converter 13 stores the lighting amount calculated by the processing at Step S4 as a candidate value 2 for the lighting amount of the segment block P1 identified by the processing at Step S5 (Step S6).

The backlight lighting amount calculator 12 calculates the lighting amount of the next logical block b1 (Step S7). With reference to the conversion table, the backlight control converter 13 identifies the segment block P1 associated with the logical block b1 (Step S8). The backlight control converter 13 stores the lighting amount calculated by the processing at Step S7 as a candidate value 3 for the lighting amount of the segment block P1 identified by the processing at Step S8 (Step S9).

The backlight lighting amount calculator 12 calculates the lighting amount of the next logical block b2 (Step S10). With reference to the conversion table, the backlight control converter 13 identifies the segment block P1 associated with the logical block b2 (Step S11). The backlight control converter 13 stores the lighting amount calculated by the processing at Step S10 as a candidate value 4 for the lighting amount of the segment block P1 identified by the processing at Step S11 (Step S12).

The backlight lighting amount calculator 12 compares the candidate values 1, 2, 3, and 4 for the lighting amount in the same one segment block P1 that have been stored by the processing at Steps S3, S6, S9, and S12. The maximum value of the candidate values for the lighting amount in the same one segment block P1 is stored as the lighting amount of the segment block (Step S15). In this manner, in the processing at Step S15, the lighting amount higher than any other of the candidate values 1, 2, 3, and 4 for the lighting amount is determined as the lighting amount of the segment block P1.

If the calculation of the lighting amounts of all the logical blocks is not finished (No at Step S20), the backlight lighting amount calculator 12 returns the process to Step S1. If the calculation of the lighting amounts of all the logical blocks is finished (Yes at Step S20), the backlight lighting amount calculator 12 performs processing at Step S21.

Based on the lighting amounts of all the segment blocks calculated and stored by the backlight lighting amount calculator 12, the luminance distribution calculator 14 calculates the luminance distribution of the light with which the illuminator 50 illuminates the display area OA (Step S21).

The image processor 15 outputs the output signals OP based on the input signals IP and the luminance distribution of the light calculated by the luminance distribution calculator 14 (Step S22).

While the example described above exemplifies the logical blocks a1, a2, b1, and b2 in the segment block P1, the same processing is performed on the logical blocks included in the other segment blocks.

The processing described with reference to FIG. 10 is a mere example, and the processing is not limited thereto. For example, in the processing at each of Steps S6, S9, and S12, the backlight lighting amount calculator 12 may store only a value higher than the already stored candidate values for the lighting amount of the segment block, instead of performing the processing at Step S15.

As illustrated in FIG. 7, the backlight control converter 13 generates and outputs the light source drive signals BL based on the lighting amount of the segment block. Specifically, the backlight control converter 13 outputs the light source drive signals BL according to the lighting amount of the segment block determined based on the lighting amounts of the logical blocks, the light source drive signals BL serving as commands for lighting the light sources 51 in the segment block. Thus, the lighting amounts of the segment blocks are individually controlled. In other words, each of the segment blocks is provided such that the luminance of the light in the segment block is individually controlled according to the lighting amounts.

The luminance distribution calculator 14 calculates the luminance distribution of the light with which the display area OA is illuminated by the illuminator 50 that operates according to the light source drive signals BL output by the backlight control converter 13. The luminance distribution calculator 14 calculates the luminance distribution of the light with which the display area OA is illuminated by the illuminator 50 with reference to luminance distribution data indicating a correspondence relation between the lighting amount of each of the segment blocks and the luminance distribution of the light with which the display area OA is illuminated. The luminance distribution data is derived in advance by measurement or simulation. The luminance distribution data is, for example, installed in the signal processor 10 in a form capable of being referenced by the luminance distribution calculator 14.

The image processor 15 outputs the output signals OP based on the input signals IP and the luminance distribution of the light calculated by the luminance distribution calculator 14. Specifically, based on the gradation values of the pixels represented by the input signals IP and the luminance of the light for illuminating the pixels, the image processor 15 determines the gradation values of the pixels in the output signals OP on a pixel-by-pixel basis.

For example, in the case of a pixel controlled to correspond to gradation values of (R,G,B)=(255,255,255), the luminance of the light for illuminating the pixel so as to obtain a display output as represented by the gradation values is assumed to be 100 [%]. Regardless of the control state of the pixel, the luminance of the light for obtaining a display output corresponding to gradation values of (R,G,B)=(0,0,0) is assumed to be 0 [%]. If the luminance of the light for illuminating a pixel is n [%], the image processor 15 obtains the gradation values of the pixel represented by the output signals OP by multiplying the gradation values of the pixel represented by the input signals IP by (100/n). For example, if the luminance of the light for illuminating a pixel corresponding to gradation values of (R,G,B)=(100, 100,100) is 50 [%], the image processor 15 generates the output signals OP representing the gradation values of the pixel as (R,G,B)=(200,200,200), and outputs the output signals OP. Thus, the gradation value control can be performed according to the luminance of the light for illuminating each of the pixels. In other words, the display output corresponding to the input signals IP can be obtained under the condition where the lighting amounts of the segment blocks are individually controlled.

As described above, according to this embodiment, the luminance can be individually controlled for each of the segment blocks including segment blocks, in each of which at least two light source rows each including more than one of the light sources 51 arranged in the first direction are arranged in the second direction intersecting the first direction, and none of the light sources 51 included in the two light source rows adjacent in the second direction are in the same straight line along the second direction. Consequently, the display panel can be illuminated by individually controlling the luminance of each of the segment blocks having a greater variety of shapes without being limited by the matrix arrangement (row-column configuration) of the light sources 51. As a result, the light sources 51 can be arranged more flexibly even in the case of illuminating a non-rectangular display panel that is difficult to simply employ the matrix arrangement of the light sources 51. Accordingly, the unit of controlling the luminance of the light can be set that is more easily compatible with a display panel having any shape not limited to the rectangular shape.

The light sources 51 included in the two light source rows adjacent in the first direction among the light source rows in the segment blocks are located in the same straight line along the first direction. Therefore, the arrangement of the light sources 51 can be more easily simplified. The intervals in the second direction between the light sources 51 included in the adjacent light source rows can be constant. Accordingly, the relation between the luminance of the light sources 51 and the luminance distribution of the illumination of the display area OA can be more easily simplified.

The interval in the first direction between the light sources 51 is the same in each of the light source rows in the segment blocks satisfying the predetermined condition. Consequently, the management of the distance between the adjacent light sources 51 can be more simplified. Accordingly, the relation between the luminance of the light sources 51 and the luminance distribution of the illumination of the display area OA can be more easily simplified.

In any one of the segment blocks satisfying the predetermined condition, the light sources 51 included in the two light source rows adjacent in the second direction are arranged in a staggered manner. Consequently, the staggered arrangement causes the positional relations in the first direction of the light sources 51 in the respective light source rows to be more similar to each other than in the case where the interval in the first direction between the light sources 51 greatly differs between the adjacent light source rows because the arrangement of the light sources 51 is irregular between light source rows. Accordingly, in any one of the segment blocks satisfying the predetermined condition, the luminance distribution in the first direction of the light emitted from each of the adjacent light source rows can be more easily made uniform.

In any one of the segment blocks satisfying the predetermined condition, one of the light sources 51 included in one of the two light source rows adjacent in the second direction is located on the straight line intersecting the first direction at right angles in the intermediate position between the two light sources 51 adjacent in the first direction in the other of the two light source rows. Consequently, the distances from the one of the light sources 51 to the two light sources 51 can be equal to each other. Accordingly, the relation between the luminance of the light sources 51 and the luminance distribution of the illumination of the display area OA can be more easily simplified.

In particular, when the light sources 51 are LEDs, the luminance distribution of the light from one of the light sources 51 is concentric. Accordingly, the uniformity of the luminance distribution of the light from the illuminator 50 can be more easily ensured by making the distances from the one of the light sources 51 to the two light sources 51 equal to each other. Moreover, the uniformity of the luminance distribution of the light can be still more easily ensured by making the distance between the two light sources 51 and the distances from the one of the light sources 51 to the two light sources 51 equal to one another.

Each of the display panel 30, the display area OA, and the illuminator 50 has a planar shape other than a rectangular shape along the first direction and the second direction. Therefore, the display device 1 can have a shape other than a rectangular shape. Accordingly, demands can be met for the display device 1 accommodated in a housing having a display output surface other than a rectangular surface.

At least one of the segment blocks does not satisfy the predetermined condition. Therefore, the light sources 51 can be arranged more flexibly without being constrained by the predetermined condition.

Figure 11:
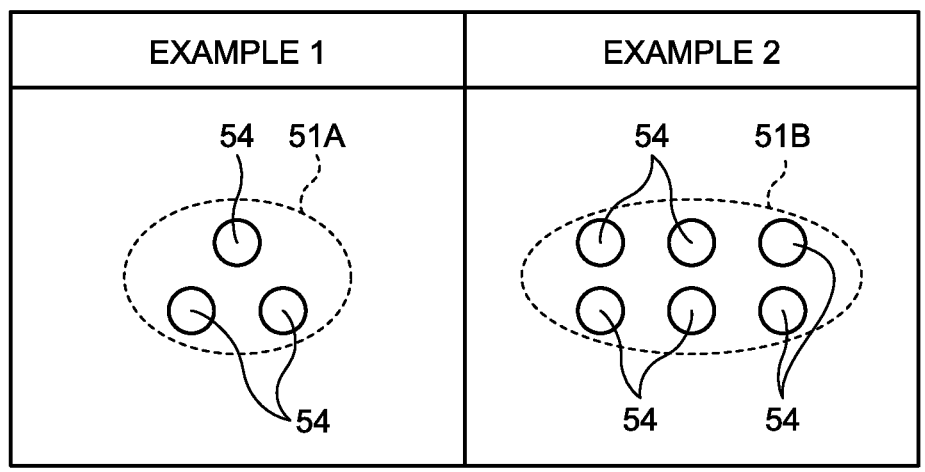
FIG. 11 is a diagram illustrating arrangement examples of the light sources arranged in one of the logical blocks.

The embodiment described above is a mere example and not limited thereto, and can be changed as appropriate within the scope not departing from the claims of the present invention FIG. 11 is a diagram illustrating arrangement examples of the light sources 51 arranged in one of the logical blocks. In the above-described embodiment, one light source 51 is disposed in one logical block. This is, however, a mere example, and the present invention is not limited thereto. The number of the light sources 51 disposed in each of the logical blocks is not limited to one. For example, as illustrated in Example 1 of FIG. 11, three light-emitting elements 54 arranged so as to form the apexes of a triangle may be treated as a cluster of light sources 51A. Alternatively, the light-emitting elements 54 arranged in one row or a plurality of rows may be treated as a cluster of light sources 51B. Example 2 of FIG. 11 exemplifies a case where two rows of the light-emitting elements 54 with each row including three of the light-emitting elements 54 arranged in a line are treated as the cluster of light sources 51B. The number of rows and the number of the light-emitting elements 54 in each of the rows can be changed as appropriate. Each of the clusters of light sources 51A and 51B exemplified in FIG. 11 can be treated as one of the light sources 51 in the above-described embodiment.

Figure 12:
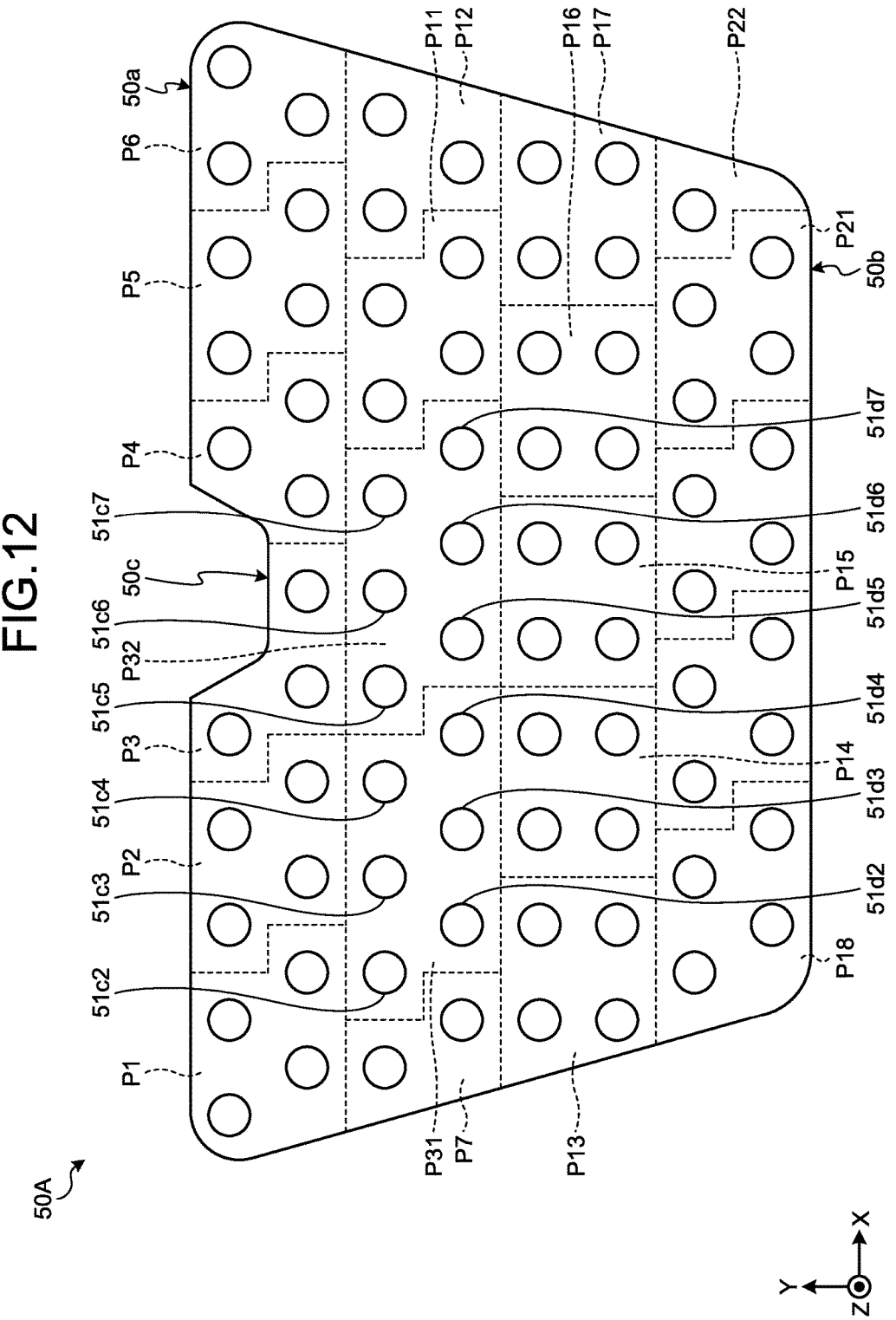
FIG. 12 is a diagram illustrating a setting example of the segment blocks different from that of FIG. 6.

FIG. 12 is a diagram illustrating a setting example of the segment blocks different from those of FIG. 6. As illustrated in FIG. 12, an illuminator 50A may include at least two segment blocks satisfying the predetermined condition, and the segment blocks satisfying the predetermined condition may have a different number of the light sources 51. The example illustrated in FIG. 12 is the same as that illustrated in FIG. 6 except that two segment blocks P31 and P32 are set instead of the three segment blocks P8, P9, and P10 in FIG. 6. The segment block P31 includes a light source 51$c$2, the light source 51$c$3, and the light source 51$c$4 included in the light source row having the coordinate c, and a light source 51$d$2, the light source 51$d$3, and the light source 51$d$4 included in the light source row having the coordinate d. The segment block P32 includes a light source 51$c$5, a light source 51$c$6, and a light source 51$c$7 included in the light source row having the coordinate c, and a light source 51$d$5, a light source 51$d$6, and a light source 51$d$7 included in the light source row having the coordinate d.

In the example illustrated in FIG. 12, the segment blocks satisfying the predetermined condition include segment blocks, such as the segment block P1, each including four of the light sources 51, and segment blocks, such as the segment blocks P31 and P32, each including six of the light sources 51. In other words, in the example illustrated in FIG. 12, the number of the light sources 51 included in each of the segment blocks satisfying the predetermined condition differs between the segment blocks. The segment blocks can be set more flexibly by allowing such non-uniformity. The number of the light source rows included in each of the segment blocks satisfying the predetermined condition and the number of the light sources 51 included in each of the light source rows can be changed as appropriate.

Other operational advantages accruing from the aspects described in the embodiment that are obvious from the description herein or that are appropriately conceivable by those skilled in the art will naturally be understood as accruing from the present invention.

What is claimed is:

1. A display device comprising:
a display panel having a display area including a plurality of pixels; and
an illuminator provided so as to overlap the display panel and configured to illuminate the display area,
wherein the illuminator has a plurality of segment blocks set in different positions in the display area,
wherein each of the segment blocks is provided such that luminance of the segment block is individually controlled,
wherein at least one of the segment blocks satisfies a predetermined condition, and
wherein the predetermined condition is such that at least two light source rows each including a plurality of light sources arranged in a first direction are arranged in a second direction intersecting the first direction, and that none of the light sources included in the two light source rows adjacent in the second direction are in the same straight line along the second direction.

2. The display device according to claim 1,
wherein the light sources included in two light source rows adjacent in the first direction among the light source rows in the segment blocks are located in the same straight line along the first direction.

3. The display device according to claim 2,
wherein an interval in the first direction between the light sources is the same in each of the light source rows in the segment blocks satisfying the predetermined condition.

4. The display device according to claim 1,
wherein, in any one of the segment blocks satisfying the predetermined condition, the light sources included in the two light source rows adjacent in the second direction are arranged in a staggered manner.

5. The display device according to claim 4,
wherein, in any one of the segment blocks satisfying the predetermined condition, one of the light sources included in one of the two light source rows adjacent in the second direction is located on a straight line intersecting the first direction at right angles in an intermediate position between the two light sources adjacent in the first direction in the other of the two light source rows.

6. The display device according to claim 1,
wherein each of the display panel, the display area, and the illuminator has a planar shape other than a rectangular shape along the first direction and the second direction.

7. The display device according to claim 1,
wherein at least one of the segment blocks does not satisfy the predetermined condition.

8. The display device according to claim 1,
wherein at least two of the segment blocks satisfy the predetermined condition, and
wherein the segment blocks satisfying the predetermined condition have different number of the light sources.

* * * * *